United States Patent [19]

Batog et al.

[11] Patent Number: 5,736,691
[45] Date of Patent: Apr. 7, 1998

[54] ACOUSTIC BARRIER FOR MOBILE MACHINERY

[75] Inventors: Stephen L. Batog, Coal Valley; Robert T. Peterson, Gladstone, both of Ill.

[73] Assignee: Case Corporation, Racine, Wis.

[21] Appl. No.: 498,034

[22] Filed: Jul. 3, 1995

[51] Int. Cl.$^6$ .............. E04B 9/00; B62D 25/20; G05G 1/00
[52] U.S. Cl. .............. 181/284; 180/90.6; 74/566
[58] Field of Search .............. 181/200, 202, 181/203, 204, 207, 208, 284, 285, 294, 210; 180/90.6, 90, 84; 74/566, 523

[56] References Cited

U.S. PATENT DOCUMENTS

| | | | |
|---|---|---|---|
| 1,104,370 | 7/1914 | McCormick | 180/90.6 |
| 1,247,208 | 11/1917 | Berg | 180/90.6 |
| 1,395,359 | 11/1921 | Rockey | |
| 1,436,530 | 11/1922 | Ray | |
| 1,503,756 | 8/1924 | Hasselberger | |
| 1,558,759 | 10/1925 | Richardson | |
| 1,576,493 | 3/1926 | Young | |
| 1,905,371 | 4/1933 | Duffy | 180/90.6 |
| 1,955,453 | 4/1934 | Fletcher et al. | 180/90.6 |
| 3,414,316 | 12/1968 | Williams et al. | |
| 3,732,746 | 5/1973 | Fitzpatrick | 74/523 |
| 4,029,324 | 6/1977 | Berkes | 74/566 |
| 4,191,273 | 3/1980 | Williams | 181/200 X |
| 4,351,199 | 9/1982 | Mozingo | |
| 4,949,983 | 8/1990 | Miller | 74/566 |
| 5,303,792 | 4/1994 | Shimizu | 180/90.6 |

*Primary Examiner*—Khanh Dang
*Attorney, Agent, or Firm*—Jansson, Shupe, Bridge & Munger, Ltd.

[57] ABSTRACT

Disclosed is a foam sound barrier for a machine such as a construction machine having several control levers. The barrier includes acoustic blocks, each of which has a notch between plural projections. Such blocks are made of acoustic material for sound-deadening and define a clearance portion (i.e., a hole) for accommodating the levers. In one embodiment, the blocks are conformably "saw-tooth" shaped for wedge fit against one another and in another embodiment, the blocks are collinear and retain a bellows-like boot around one of the levers. The embodiments can be used alone or together. The barrier reduces sound level by at least about 0.8 decibels and also helps exclude dirt from the machine operator's compartment.

10 Claims, 6 Drawing Sheets

ACOUSTIC BARRIER FOR MOBILE MACHINERY

FIELD OF THE INVENTION

This invention relates generally to acoustics and, more particularly, to sound attenuation.

BACKGROUND OF THE INVENTION

So-called "noise pollution" has and is receiving attention from governmental regulators and from manufacturers of machines having what some believe to be objectionable sound levels during operation. Rising sound levels exhibit increasing acoustic "power" and at some magnitude, sound levels become annoying. They tend to detract from one's ability to concentrate and when extremely high, hearing can be temporarily or permanently impaired.

Manufacturers of mobile machines have been and continue to deal with the problem of sound levels in the machine operator's compartment. At least in part because of the advent of hydraulic controls, elevated sound levels can be relatively constant, even over several hours of machine operation.

This is so since the operator need not change engine speed to change the speed of a machine function, e.g., the rate at which a loader bucket travels or is raised or lowered. Rather, the engine runs at relatively-high constant speed, e.g., 2200–2400 RPM, and lever-operated hydraulic valves are used to control function speed. Thus, engine noise is persistent.

One "path" by which noise (including but not limited to engine noise) enters the operator's compartment is through the compartment floor. In many types of machines, it is not possible to make such floor imperforate since the hydraulic valves are below the floor and, of course, the valve levers (as well as, perhaps, other levers) must protrude through the floor for access by the operator.

And such levers must be capable of movement, albeit somewhat limited movement. Openings through the floor to permit such movement also undesirably permit noise to enter the operator's compartment. And noise is not the only "contaminant" to enter such compartment through floor openings. Dust also enters such openings and impairs air quality in the working environment.

One approach to providing a seal around control levers is shown in U.S. Pat. No. 4,351,199 (Mozingo) and uses a rubber block "captured" for sliding movement between two cover plates mounted on a metal floor. The control lever extends through the block and the lever and block are free to move together. While noise suppression is not expressly mentioned as a benefit, a degree of noise suppression nevertheless results. A significant disadvantage of the Mozingo arrangement is its cost of manufacture.

Another approach is shown in U.S. Pat. No. 1,503,756 (Hasselberger) and uses what is described as a roller-and-shade mechanism. Another, shown in U.S. Pat. No. 3,414,316 (Williams et al.), is of what might be described as the "continuous slot" type.

While these and other prior art approaches have been generally satisfactory for their intended purposes, they are believed to provide less-than-adequate attenuation of noise that may otherwise enter an operator's compartment. And, in view of the invention, they are more complex than necessary.

OBJECTS OF THE INVENTION

It is an object of the invention to provide an acoustic barrier overcoming some of the problems and shortcomings of the prior art.

Another object of the invention is to provide an acoustic barrier which is easier to manufacture and install on a machine.

Another object of the invention is to provide an acoustic barrier which effectively attenuates sound.

Yet another object of the invention is to provide an acoustic barrier useful with installations involving "through-the-floor" control levers.

Another object of the invention is to provide an acoustic barrier which provides an effective seal around such levers.

Another object of the invention is to provide an acoustic barrier which is particularly well suited for use with mobile machinery including mobile construction machinery.

Still another object of the invention is to provide an acoustic barrier which is effective in excluding dust and dirt from a machine operator's compartment. How these and other objects are accomplished will become apparent from the following descriptions and from the drawings.

SUMMARY OF THE INVENTION

The invention involves an acoustic barrier for a machine of the type which exhibits undesirably-high noise levels during operation. The barrier is particularly well suited for such machines having plural control levers used during machine operation. Examples include construction machines such as backhoes, front-end loaders and the like.

The new barrier has first and second blocks, each of which includes a notch between plural projections. The blocks, made of acoustic material for sound attenuation, define an opening or clearance portion around each of the control levers. Each block has an abutment edge generally conformably shaped to the abutment edge of the other block.

The first block has two clearance portions for accommodating first and second control levers, respectively, while the second block has a clearance portion for accommodating the third control lever. The barrier inhibits passage of dirt as well as sound when the barrier is installed in the machine with the blocks against one another along their respective abutment edges.

In one embodiment of the invention, the block abutment edges (or at least parts thereof) are sawtooth-shaped to be "wedge-fitted" together and the clearance portions are round or oblong openings. To effect such wedge fitting, the projection of the second block is conformably shaped to the notch of the first block. Each projection, whether of the first or second block, includes one of the clearance portions for receiving a control lever. Most preferably, each projection is slit and therefore bifurcated for positioning one of the clearance portions to encircle a respective control lever.

Another embodiment of the inventive barrier accommodates use of a bellows-like boot for sealing around each lever. In such embodiment, each of plural projections of the first block abuts a respective projection of the second block. The notch of the first block is in registry with the notch of the second block and the boundaries of the notches retain the boot.

More specifically, the boot (or each boot) has a proximal portion retained by the acoustic blocks and a distal portion sealing around one of the control levers. Such boot proximal portion has an annular flange-like retention member bearing against the undersurfaces of the blocks. In addition to retaining the boot, such annular member also helps provide a seal between such member and the blocks.

The second embodiment of the barrier is somewhat "tighter" than that of the first and, thus, is particularly useful where retention of the positive pressure in the operator's compartment (i.e., pressure above ambient pressure) is more critical. This may be because such pressure is higher than that used with the first embodiment or because the capacity of the pressurizing system is less able to make up for losses.

For preferred sound attenuation, the blocks have a thickness equal to at least twice the maximum cross-sectional dimension of any of the control levers with which the barrier will be used. A highly-preferred barrier material includes low-permeability polyurethane foam, the top and bottom surfaces of which are coated with Hypalon. Such Hypalon coating inhibits migration of moisture, oil and dirt into the block structure.

Another aspect of the invention involves a mobile machine having an operator's compartment and a plurality of control levers protruding from a control region through a floor area into the operator's compartment. (The control region is that space in which control valves are mounted and through which engine noise and the like can enter the operator's compartment.)

The floor area (which may be a relatively small percentage of the overall floor surface in the operator's compartment) is occluded by the acoustic blocks which define plural clearance portions around the levers. In a machine having the first embodiment of the barrier, the tooth-like projection of the second block is in wedged contact with the first and second tooth-like projections of the first block. Noise and dirt are thereby inhibited from entering the operator's compartment through the floor area.

In a more specific aspect of such first embodiment, the notch of the first block is formed by first and second faces on the first and second projections, respectively. Such first and second faces are along respective axes extending in converging directions.

In a machine equipped with a barrier of the second embodiment, such barrier has a bellows-like boot with a proximal portion retained by the acoustic blocks and a distal portion sealing around one of the control levers. The undersurfaces of the abutting blocks are adjacent to the control region and the boot proximal portion has a retention member against such undersurfaces.

Mounted in a machine, the new acoustic barrier is effective in attenuating noise. Assuming the control region is characterized by a first sound level and the operator's compartment is characterized by a second sound level, the latter is at least about 0.8 db below the first sound level.

Further details of the invention are set forth in the following detailed description and in the drawings.

DETAILED DESCRIPTION OF PREFERRED EMBODIMENTS

Figure 1:
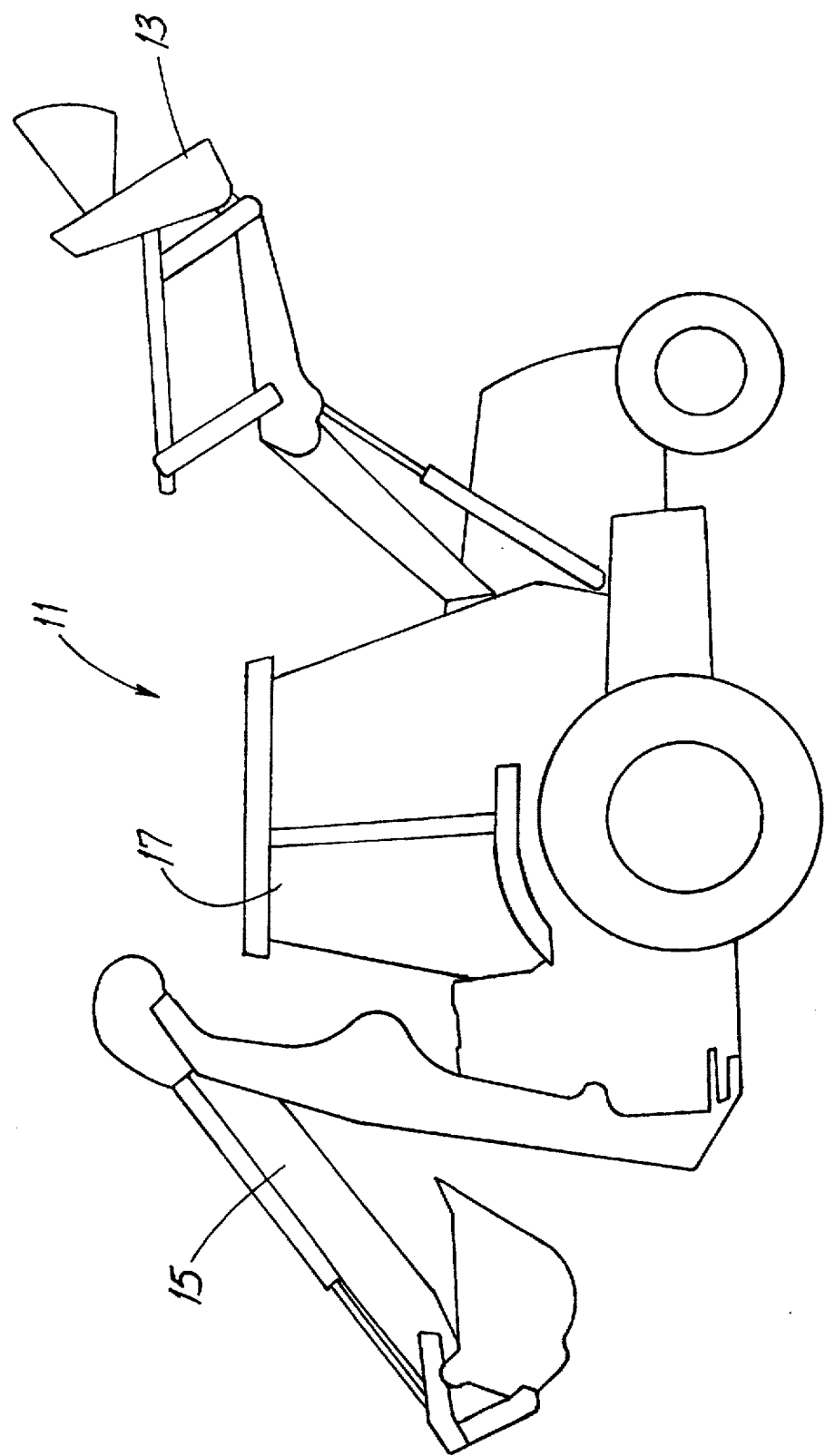
FIG. 1 is a side elevation view of a prior art loader backhoe, a representative type of machine with which the new barrier may be used.

Before describing the new acoustic barrier 10, it will be helpful to have an understanding of one way in which such barrier 10 may be used. The machine 11 of FIG. 1 is known as a loader backhoe, but one of several types of machines benefitted by the barrier 10. At its front, the machine 11 is equipped with a loader bucket 13, manipulation of which is by hydraulic controls. A backhoe 15 is at the rear of the machine 11 and is used for digging holes or trenches in the earth. It, too, is manipulated by hydraulic controls.

Figure 2:
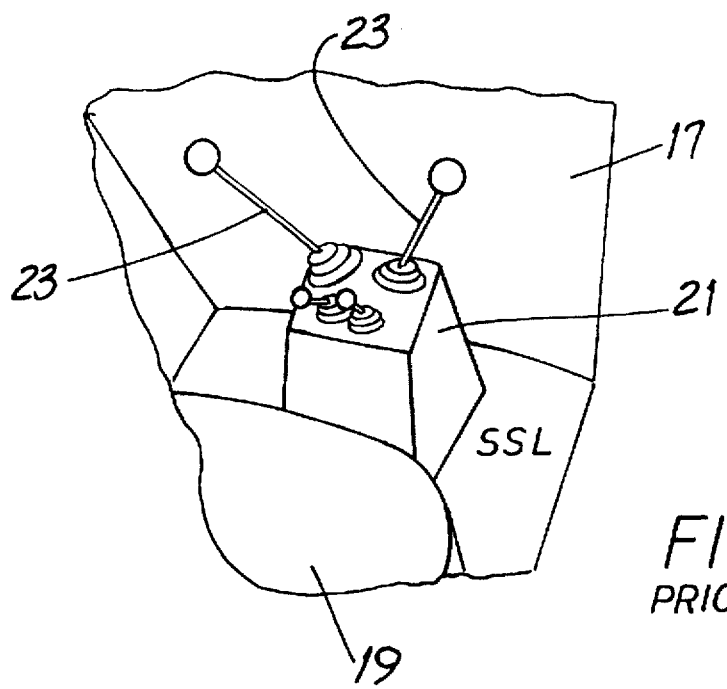
FIG. 2 is a perspective view of a portion of the operator's compartment of the prior art machine of FIG. 1. Parts are omitted.
Figure 3:
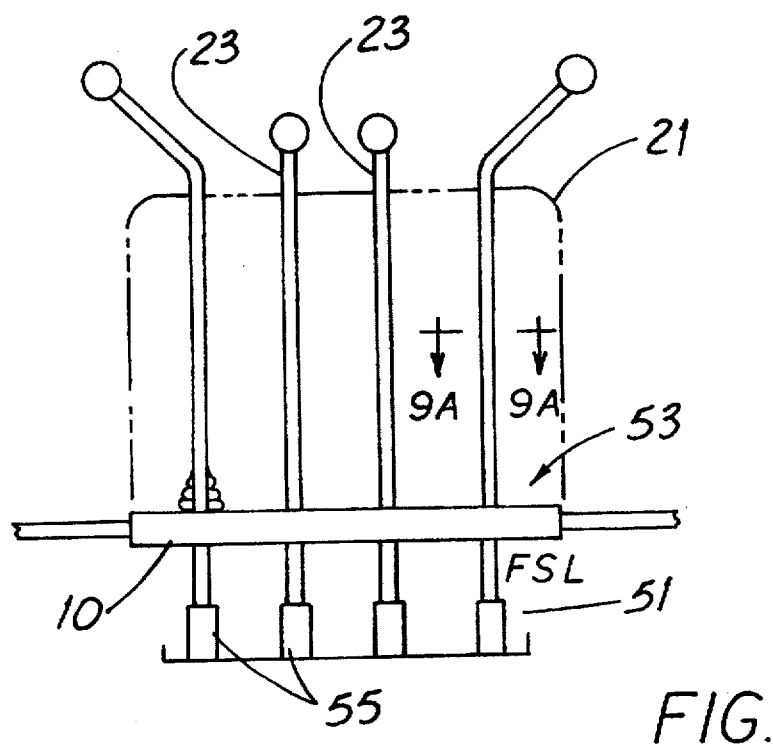
FIG. 3 is a representative elevation view of the compartment floor, control tower and control levers in the operator's compartment.

As shown in FIGS. 2 and 3, the operator's compartment 17 has a seat 19 and a "control tower" 21 with hand-operated control levers 23 protruding through it. The barrier 10 is installed generally at floor level, i.e., well below the top of the tower 21. (The control lever boots shown at the top of the tower 21 in FIG. 2 are not those described below in connection with the invention.)

Referring also to FIGS. 2, 3, 4, 5, 6, 7 and 8, the new barrier 10 has first and second blocks 25, 27, respectively, each of which includes a notch 29 between plural projections 31. The blocks 25, 27 made of acoustic material for sound attenuation, define a clearance portion 33 in close proximity to each of the control levers 23. Each block 25, 27 has an abutment edge 35 generally conformably shaped to the abutment edge 35 of the other block.

The first block 25 has two clearance portions 33 for accommodating first and second control levers 23 while the second block 27 has a clearance portion 33 for accommodating the third control lever 23. The barrier 10 inhibits passage of dirt as well as sound when the barrier is installed in the machine 11 with the blocks 25, 27 against one another along their respective abutment edges 35.

Figure 4:
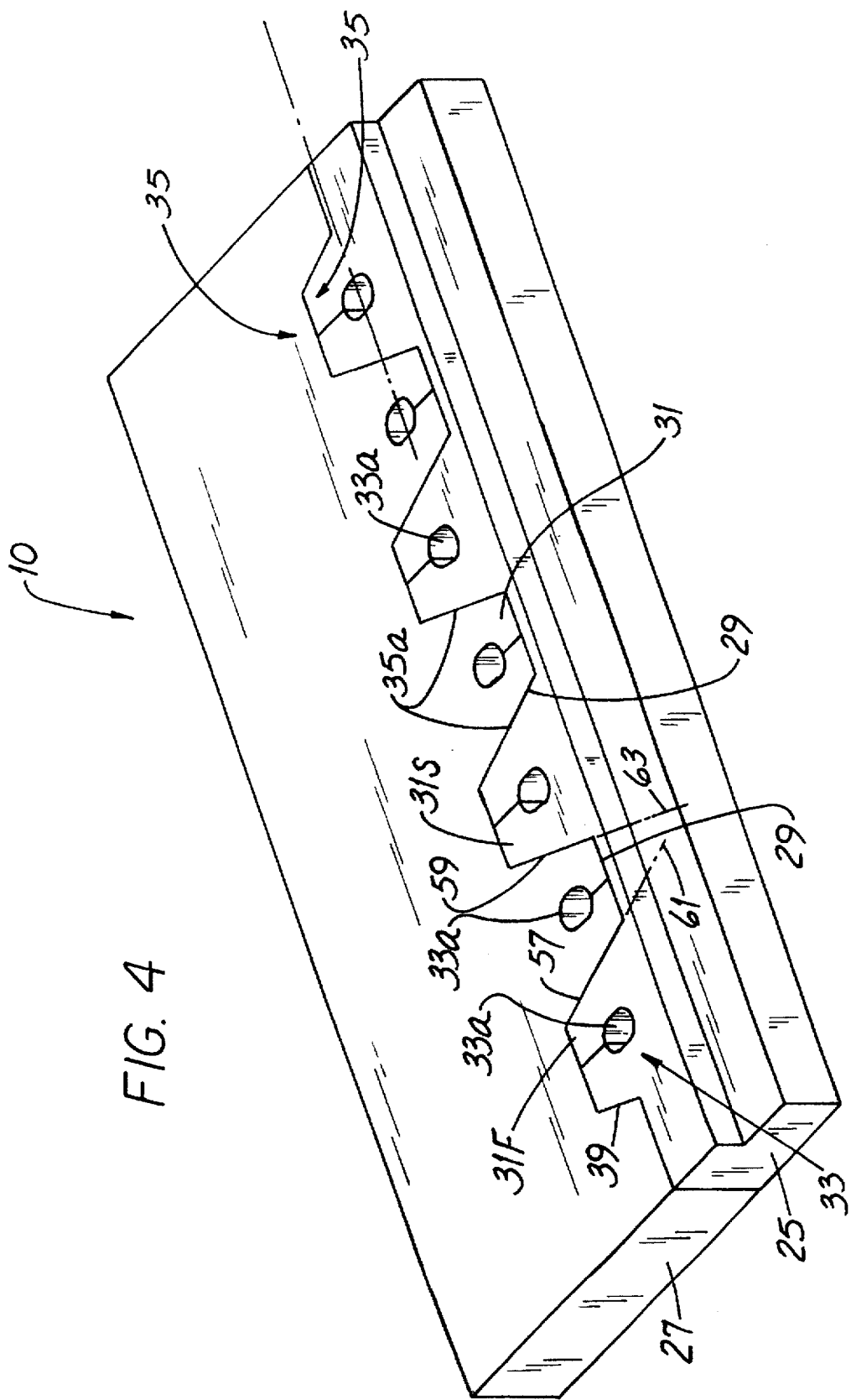
FIG. 4 is a perspective view of a first embodiment of the new acoustic barrier.
Figure 5:
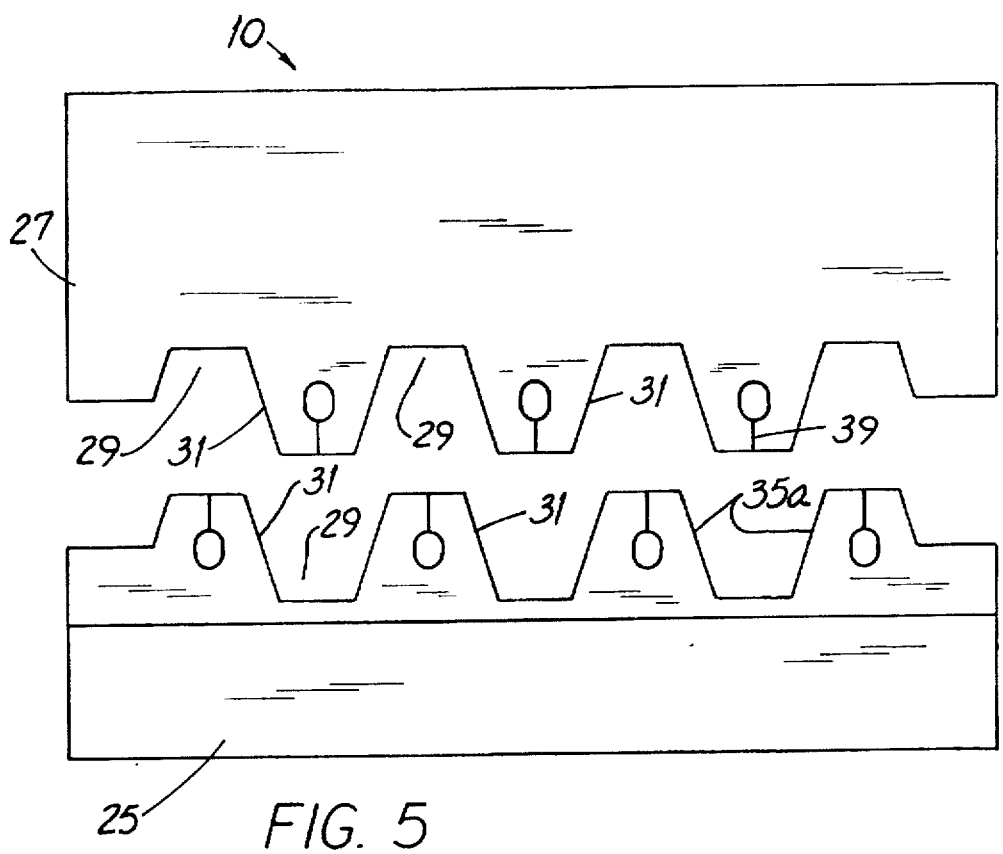
FIG. 5 is a top plan view of the barrier of FIG. 4 shown with the acoustic blocks slightly spaced from one another.

In the first embodiment shown in FIGS. 4 and 5, the block abutment edges 35a (or at least parts thereof) are angled to an axis 37 through the levers 23 and are sawtooth-like to be "wedge-fitted" together. To effect such wedge fitting, a projection 31 of the second block 27 is conformably shaped to the notch 29 of the first block 25. Each projection 31, whether of the first or second block 25 or 27 includes one of the clearance portions 33a (an ovoid opening) for receiving a control lever 23 through such portion 33a. Most preferably, each projection 31 has a slit 39 and is thereby bifurcated for positioning one of the clearance portions 33a to encircle a respective control lever 23.

Figure 6:
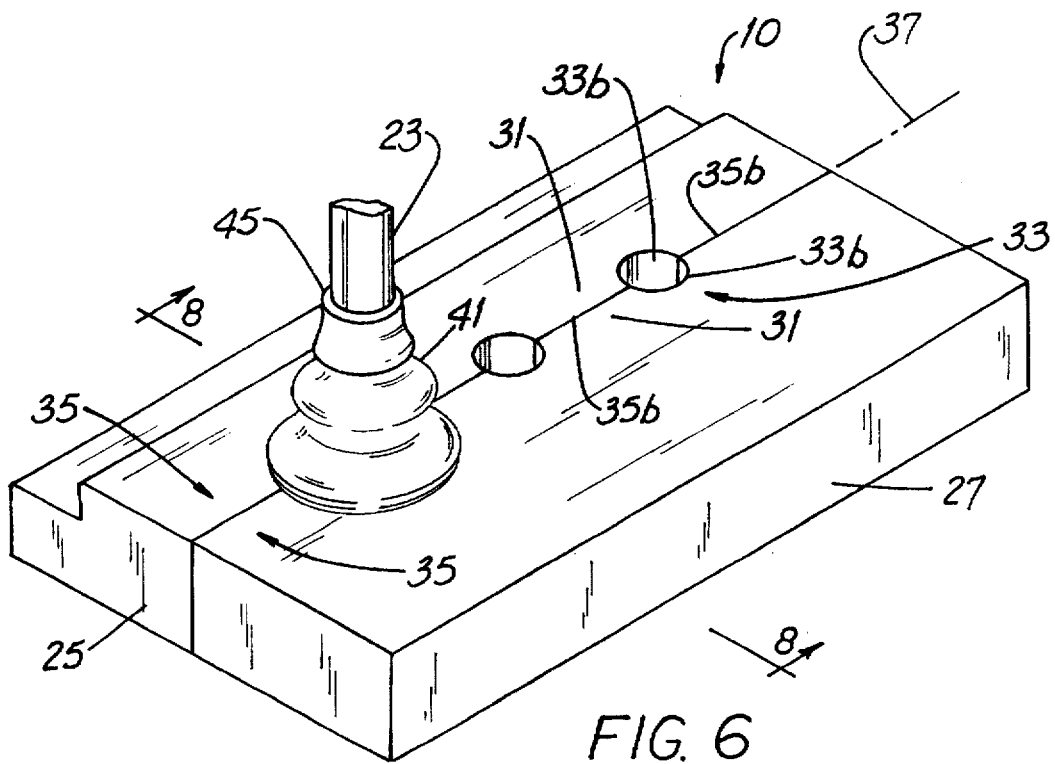
FIG. 6 is a perspective view of a second embodiment of the new acoustic barrier shown in conjunction with a control lever and a bellows-like boot sealing around the lever. Parts are broken away.
Figure 8:
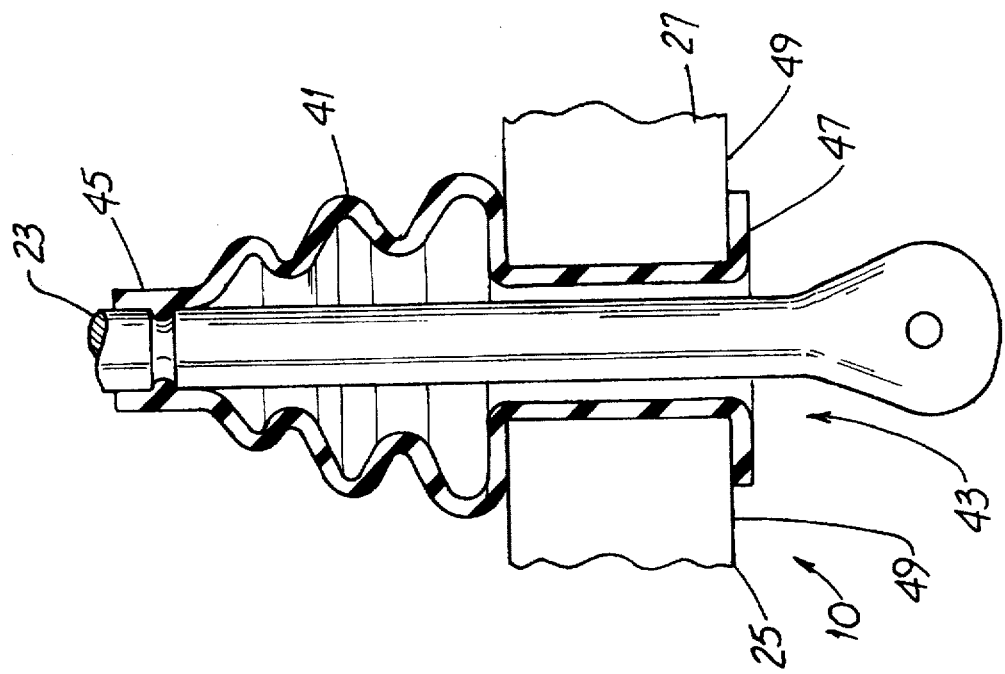
FIG. 8 is a section elevation view taken along the viewing plane 8—8 of FIG. 6. Parts are broken away.
Figure 7:
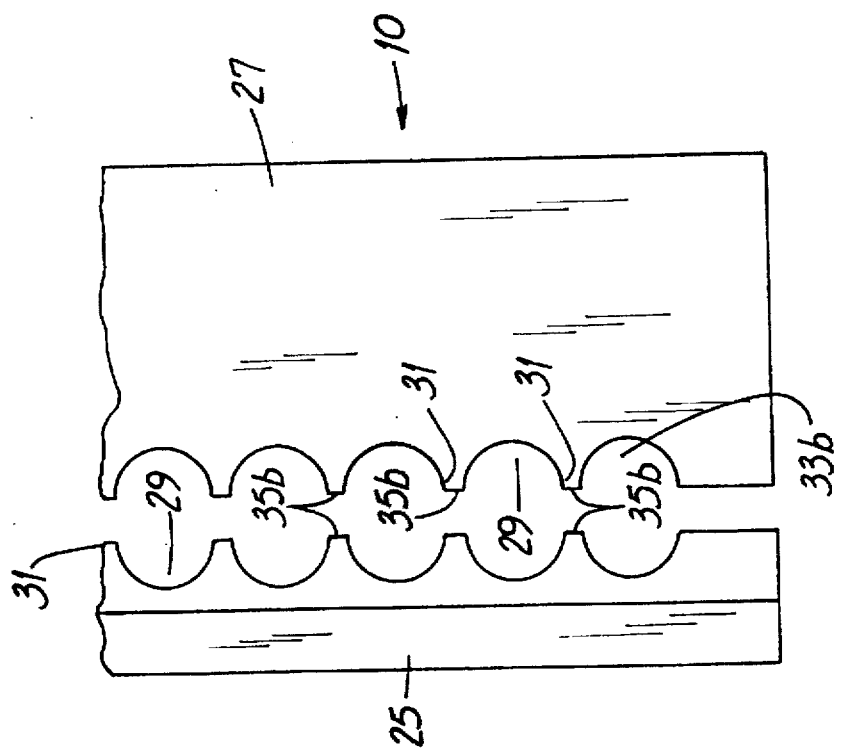
FIG. 7 is a top plan view of the barrier of FIG. 6 shown with the acoustic blocks slightly spaced from one another.

In the second embodiment of FIGS. 6, 7 and 8, the clearance portion 33b is semi-circular and the abutment edges 35b are collinear and parallel to (and preferably coincident with) the axis 37. This second embodiment of the inventive barrier 10 accommodates a bellows-like boot 41 for sealing around each lever 23. In such embodiment, each of plural projections 31 of the first block 25 abuts a respective projection 31 of the second block 27. As best seen in FIG. 6, the clearance portion 33b of the first block 25 is in registry with the clearance portion 33b of the second block 27 and the boundaries of the portions 33b retain the boot 41.

As best seen in FIG. 8, the boot 41 (or each boot 41 if there is more than one) has a proximal portion 43 retained by the acoustic blocks 25, 27 and a distal portion 45 sealing around one of the control levers 23. Such boot proximal portion 43 includes an annular flange-like retention member 47 bearing against the undersurfaces 49 of the blocks 25, 27. In addition to retaining the boot 41, such annular member 47 helps provide a seal between such member 47 and the blocks 25, 27.

The barrier 10 of FIGS. 6, 7 and 8 is somewhat "tighter" than that of the first embodiment and, thus, is particularly useful where retention of the positive pressure in the operator's compartment 17 (i.e., pressure above ambient pressure) is more critical. That is, the second embodiment of the barrier 10 may be preferred where compartment pressure is higher than that used with the first embodiment or where the capacity of the pressurizing system is less able to make up for losses.

Figure 9A:
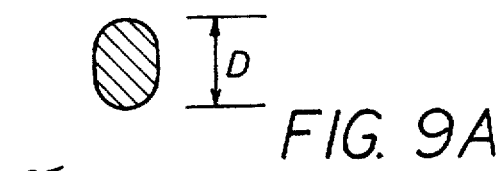
FIG. 9A is a cross-section view of a representative control lever taken along the viewing plane 9A—9A of FIG. 3.
Figure 9B:
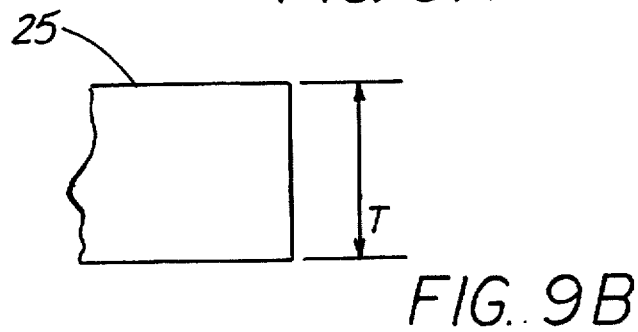
FIG. 9B is an elevation view of the barrier illustrating the thickness thereof.

Referring also to FIGS. 9A and 9B, for preferred sound attenuation, the blocks (e.g., block 25) have a thickness T equal to at least twice the maximum cross-sectional dimension D of the control levers 23 with which the barrier 10 will be used. A highly-preferred barrier material includes low-permeability polyurethane foam, the top and bottom surfaces of which are coated with HYPALON. Such HYPALON coating inhibits migration of moisture, oil and dirt into the block structure.

Referring again to FIGS. 1–8, another aspect of the invention involves a mobile machine 11 having an operator's compartment 17 and a plurality of control levers 23 protruding from a control region 51 through a floor area 53 into the operator's compartment 17. (The control region 51 is that space in which control valves 55 are mounted and through which engine noise and the like can enter the operator's compartment 17.)

The floor area 53 (which may be a relatively small percentage of the overall floor surface in the operator's compartment 17) is occluded by the acoustic blocks 25, 27 which define plural clearance portions 33 around respective levers 23. In a machine 11 having the first embodiment of the barrier 10, the tooth-like projection 31 of the second block 27 is in wedged contact with the first and second tooth-like projections 31 of the first block 25.

Referring particularly to FIGS. 4 and 5, the notch 29 of the first block 25 is formed by first and second faces 57, 59, respectively, on the first and second projections 31F, 31S, respectively. Such first and second faces 57, 59 are along respective axes 61, 63 extending in converging directions (or in diverging directions, depending upon one's viewing point).

As shown in FIGS. 6 and 7, the notches 29 which form the clearance portions 33b are semi-circular. When the edges 35b are abutted, the resulting circular openings receive the lever-sealing boot 41.

Mounted in a machine 11, the new acoustic barrier 10 is effective in attenuating noise. Assuming the control region 51 is characterized by a first sound level (represented by the symbol FSL) and the operator's compartment 17 is characterized by a second sound level (represented by the symbol SSL) the latter is at least about 0.8 db below the first sound level FSL.

Figure 10:
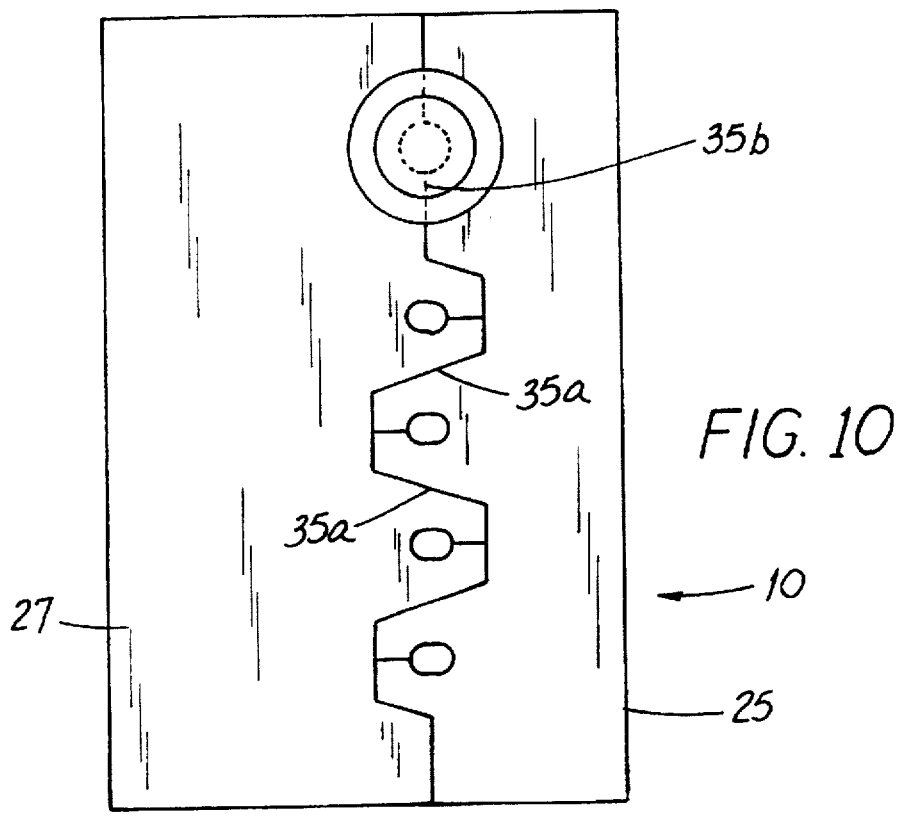
FIG. 10 is a representative top plan view of a composite barrier incorporating features of the barrier embodiments shown in FIGS. 4 and 6.

While the principles of the invention have been shown and described in connection with only a few preferred embodiments, it is to be understood clearly that such embodiments are exemplary and not limiting. For example, the two embodiments of the inventive barrier 10 are not mutually exclusive. As shown in FIG. 10, blocks 25, 27 may be configured to include sawtooth-shaped abutment edges 35a, as in the embodiment of FIGS. 4 and 5, and collinear abutment edges 35b as in the embodiment of FIGS. 6, 7 and 8. And after understanding this specification, persons of ordinary skill will appreciate how to make and use other embodiments of the invention.

We claim:

1. A sound-inhibiting barrier for a machine having plural control levers, the barrier including first and second blocks which are stationary with respect to one another and wherein:

each block includes a notch between plural tooth-shaped projections;

one of the projections of the first block wedge-fits into the notch of the second block;

each of the blocks defines a separate, lever-receiving clearance opening around each of a respective pair of control levers; and the blocks are made of foam acoustic material for sound attenuation.

2. The barrier of claim 1 wherein the levers include first, second and third control levers and wherein:

the openings in the first block receive the first and second control levers, respectively;

one of the openings in the second block receives the third control lever; and wherein:

each block has an abutment edge conformably shaped to the abutment edge of the other block, whereby the barrier inhibits passage of sound and dirt therethrough when the blocks are against one another along their respective abutment edges.

3. The barrier of claim 1 wherein:

the projections of the first block are first and second projections; and one of the projections of the second block is conformably shaped to the notch between the first and second projections.

4. The barrier of claim 3 wherein each projection includes one of the clearance openings for receiving a control lever therethrough.

5. The barrier of claim 1 wherein:

each control lever has a maximum cross-sectional dimension; and the blocks have a thickness equal to at least twice the dimension.

6. The barrier of claim 5 wherein the foam acoustic material is low-permeability polyurethane foam.

7. The barrier of claim 1 in combination with the machine and wherein such machine is a mobile machine having an operator's compartment and the plural control levers protrude from a control region into the operator's compartment, and wherein:

the first and second blocks seal around the control levers, whereby noise and dirt are inhibited from entering the operator's compartment from the control region.

8. The barrier of claim 1 wherein the projections of the first block are first and second projections and one of the projections of the second block is in wedged contact with the first and second projections of the first block.

9. The combination of claim 7 wherein:

the notch of the first block is formed by first and second faces on the first and second projections, respectively; and the first and second faces are along respective axes extending in converging directions.

10. The combination of claim 7 wherein:

the blocks are made of low-permeability polyurethane foam;

a first sound level prevails in the control region; and a second sound level prevails in the operator's compartment and such second sound level is at least about 0.8 db below the first sound level.

* * * * *